US008388559B2

(12) United States Patent
Kudoh

(10) Patent No.: US 8,388,559 B2
(45) Date of Patent: Mar. 5, 2013

(54) WALKING ASSIST DEVICE

(75) Inventor: Hiroshi Kudoh, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 462 days.

(21) Appl. No.: 12/681,314

(22) PCT Filed: Sep. 5, 2008

(86) PCT No.: PCT/JP2008/002462
§ 371 (c)(1),
(2), (4) Date: Apr. 1, 2010

(87) PCT Pub. No.: WO2009/044507
PCT Pub. Date: Apr. 9, 2009

(65) Prior Publication Data
US 2010/0210980 A1    Aug. 19, 2010

(30) Foreign Application Priority Data

Oct. 1, 2007   (JP) ................. 2007-257216

(51) Int. Cl.
*A61H 1/00*    (2006.01)
*A61H 1/02*    (2006.01)
*A61H 5/00*    (2006.01)

(52) U.S. Cl. .............................. 601/5; 601/35

(58) Field of Classification Search ............... 601/5, 23, 601/27, 32, 33–35; 602/23, 26–29
See application file for complete search history.

(56) References Cited

U.S. PATENT DOCUMENTS

| | | | | |
|---|---|---|---|---|
| 4,814,661 A * | 3/1989 | Ratzlaff et al. | ............... | 310/328 |
| 4,872,665 A * | 10/1989 | Chareire | ............... | 482/51 |
| 7,628,766 B1 * | 12/2009 | Kazerooni et al. | ............... | 602/16 |
| 8,251,930 B2 * | 8/2012 | Ido | ............... | 601/5 |
| 2006/0270951 A1 * | 11/2006 | Ikeuchi | ............... | 601/5 |
| 2006/0276728 A1 * | 12/2006 | Ashihara et al. | ............... | 601/5 |

FOREIGN PATENT DOCUMENTS

| | | |
|---|---|---|
| JP | 2007-054616 | 3/2001 |
| JP | 2005-296103 | 10/2005 |
| JP | 2006-204426 | 8/2006 |
| JP | 2007-020909 | 2/2007 |
| JP | 2007-097636 | 4/2007 |

* cited by examiner

*Primary Examiner* — Kristen Matter
(74) *Attorney, Agent, or Firm* — Rankin, Hill & Clark LLP

(57) ABSTRACT

A walking assist device is equipped with a load transmit portion, a foot attachment portion fitted to a foot of a user, and a leg link provided between the load transmit portion and the foot attachment portion. The foot attachment portion is equipped with a connecting member connected to the lower end of the leg link at a position forward of an ankle of the user while having at least a degree of rotational freedom around an axis line in a horizontal direction seen from front, and the connecting member is prevented from wobbling back and forth from the change in the direction of the load transmitted from the leg link. The foot attachment portion is equipped with the footplate member having a rigid plate capable of being stepped on by the foot of the user at outside an acting range in a sagittal plane of the load transmitted from the leg link to the connecting member. The connecting member is coupled to the footplate member so as to limit the rotation with respect to the footplate member round the axis line in the horizontal direction as seen from front.

13 Claims, 4 Drawing Sheets

WALKING ASSIST DEVICE

BACKGROUND OF THE INVENTION

1. Technical Field

The present invention relates to a walking assist device which assists walking of the user by relieving the load acting on the user's legs.

2. Description of the Related Art

Conventionally, as this type of walking assist device, there has been known a walking assist device configured from a load transmit portion, a foot attachment portion to be attached to a foot of a user, and a leg link provided between the load transmit portion and the foot attachment portion, wherein the walking assist device assists walking of the user by relieving the load acting on the legs of the user, by receiving at least a part of the weight of the user by the leg link via the load transmit portion (for example, refer to Japanese Patent Laid-open No. 2007-20909).

In the above-mentioned conventional art, the foot attachment portion is equipped with a shoe, and a stirrup-type connecting member into which the toe portion of the user may be freely inserted, which is assembled to the shoe. Then, the connecting member is connected to the lower end of the leg link at a position forward of the ankle of the user, so as to have at least a degree of rotational freedom around an axis line in a horizontal direction seen from front. By doing so, the foot attachment portion may move with respect to the leg link and following the movement of the ankle of the user, so that degree of freedom of the movement of the ankle is secured.

However, when the connecting member is connected to the leg link so as to have such a degree of rotational freedom, the direction of action of the load transmitted from the leg link to the connecting member inclines back and forth during walking with respect to the connecting member. With this, a rotational moment in the anteroposterior direction acts on the connecting member, and the connecting member wobbles back and forth. By the wobbling of the connecting member, the portion of the shoe coming into contact with the connecting member becomes worn out by being rubbed therewith, so that it becomes difficult to secure durability of the foot attachment portion.

SUMMARY OF THE INVENTION

In view of the above circumstances, an object to be solved by the present invention is to provide a walking assist device which is capable of improving durability of a foot attachment portion.

In order to accomplish the object mentioned above, the present invention provides a walking assist device, comprising: a load transmit portion, a foot attachment portion fitted to a foot of a user, and a leg link provided between the load transfer portion and the foot attachment portion, so as to support at least a part of a weight of the user by the leg link via the load transmit portion, in which the foot attachment portion is equipped with a connecting member connected to the lower end of the leg link at a position forward of an ankle of the user while having at least a degree of rotational freedom around an axis line in a horizontal direction seen from front; wherein the foot attachment portion is equipped with a footplate member comprised of a rigid plate capable of being stepped on by the foot of the user at outside an acting range in a sagittal plane (a plane along the anteroposterior direction) of the load transmitted from the leg link to the connecting member, and the connecting member is coupled to the footplate member so as to limit the rotation with respect to the footplate member around the axis line in the horizontal direction seen from front.

According to the present invention, even when the direction of action of the load transmitted from the leg link to the connecting member inclines back and forth during walking with respect to the connecting member and the rotational moment in the anteroposterior direction acts on the connecting member, the footplate member coupled to the connecting member is being stepped on by the foot of the user outside of the acting range of the load, so that the connecting member does not wobble back and forth. Therefore, wear out of the foot attachment portion caused by the wobbling of the connecting member does not occur, so that the durability of the foot attachment portion is improved.

Even though the connecting member is not fixed to the shoe by adhesion or the like, the stability of the connecting member is secured by the stepping on of the footplate member as mentioned above. As such, the footplate member coupled to the connecting member need only to be inserted into the shoe. Therefore, it is not necessary to manufacture a special shoe with the connecting member fixed thereto, so that convenience thereof is enhanced.

In the present invention, it is possible to configure the foot attachment portion from the shoe and an adapter which is externally fitted releasably to the shoe. In this case, if the footplate member and the connecting member are provided to the adapter, the stability of the connecting member is secured, by the footplate member being stepped on by the foot of the user via the sole. By doing so, the user may use the user's comfortable shoe without modification, so that the convenience is improved further.

In the present invention, it is preferable that the connecting member is coupled to the footplate member in a cantilevered state, so as to pass through a lateral inside of the portion between a toe joint and a navicular bone of the foot of the user. By doing so, in contrast to the stirrup-type connecting member of the conventional art, the foot is not constrained by the connecting member, so that the wearability is improved.

In the present invention, it is preferable that the footplate member is provided with a groove so as to cut across the footplate member. Here, in the case where the footplate member is configured from one rigid plate extending from the heel to the toe of the foot of the user, bending of the footplate member is allowed by providing the groove at the portion that need to be bent during walking (beneath the toe joint, and the like), so that walking is made easier.

In the case where the foot attachment portion includes a landing member arranged beneath the footplate member, and the landing member is provided with a pressure sensor capable of detecting a treading force of the user, disconnection of a wiring may be prevented by providing a groove to the foot plate member, and passing the wiring for the pressure sensor through the groove.

DETAILED DESCRIPTION OF THE PREFERRED EMBODIMENTS

Figure 1:
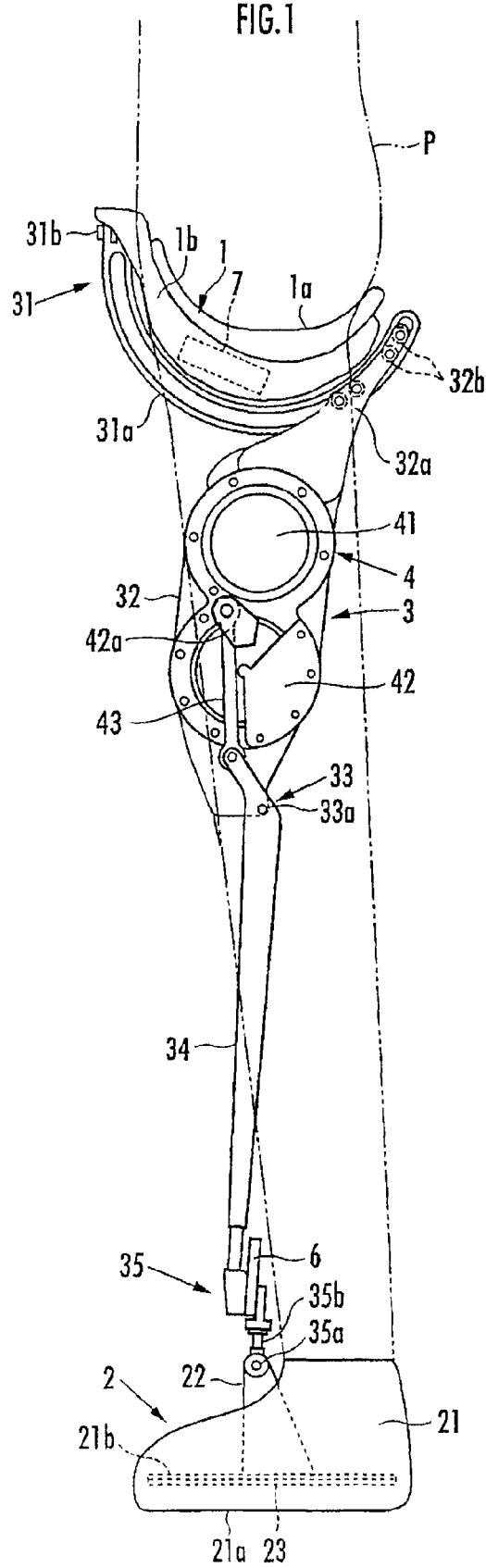
FIG. 1 is a side view according to a first embodiment of a walking assist device of the present invention.
Figure 2:
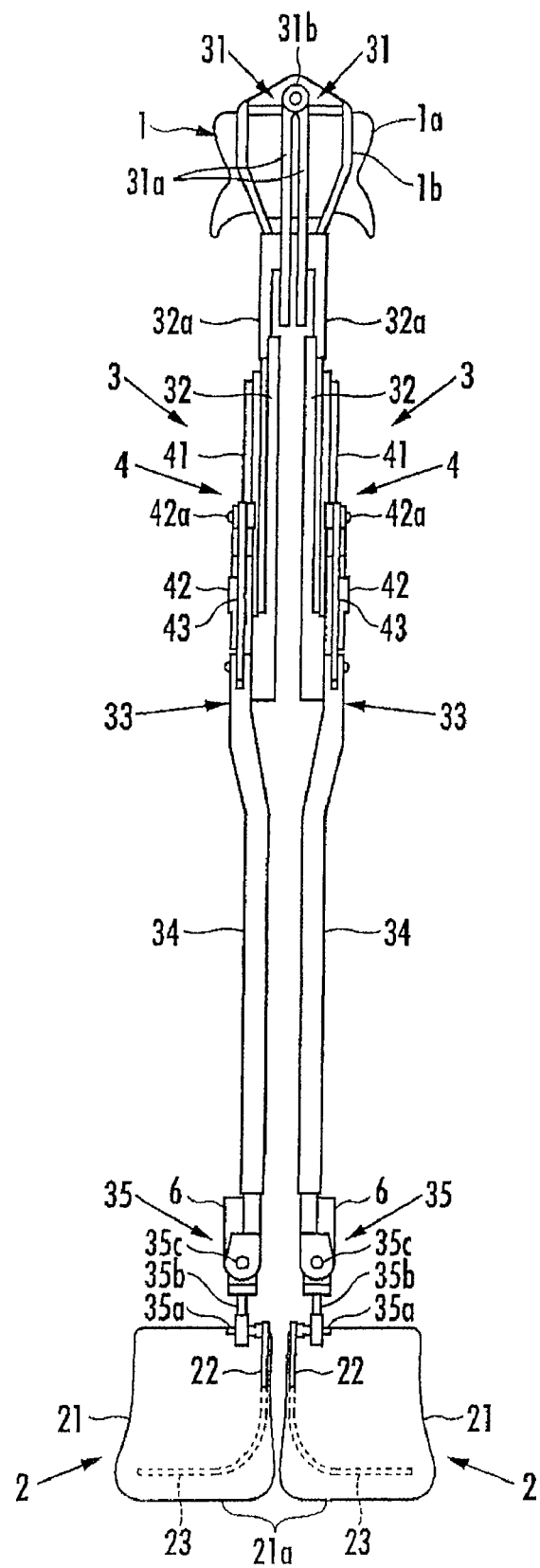
FIG. 2 is a front view according to the first embodiment.

Hereinafter, a walking assist device according to embodiments of the present invention will be described. As illustrated in FIG. 1 and FIG. 2, the walking assist device includes a seat member 1 as a load transmit portion where a user P sits astride, a pair of right and left foot attachment portions 2 and 2 fitted to the right and left feet of the user P, and a pair of right and left leg links 3 and 3 provided between the seat member 1 and the right and left foot attachment portions 2 and 2.

Each leg link 3 is configured from a link capable of bending and stretching freely, which is configured from a first link member 32 connected to the seat member 1 through a first joint member 31 at the upper end thereof so as to be able to swing freely in the anteroposterior direction, and a second link member 34 connected to the lower end of the first link member 32 via a rotary type second joint portion 33. The foot attachment portion 2 is connected to the lower end of the second link member 34 via a third joint portion 35.

The first link member 32 is mounted with a driving 2C) unit 4 for the second joint portion 33. According to the rotation of the second joint portion 33 driven by the driving unit 4, each leg link 3 is actuated in a stretching direction, that is, in a direction for pushing the seat member 1 upward, so as to generate an assist force to support at least a part of a body weight of the user P (hereinafter, referred to as a body weight relieving assist force). The body weight relieving assist force generated in each leg link 3 is transmitted to the body trunk of the user P via the seat member 1 to relieve the load acted on a leg of the user P.

The seat member 1 is configured from a seat portion 1a and a support frame 1b. The seat portion 1a is of a saddle shape to be seated by the user P. The support frame 1b is disposed below the seat portion 1a to support the seat portion 1a.

The first joint portion 31 at the upper end of each leg link 3 is further provided with a guide rail 31a of an arc shape, which is connected to the lower side of the seat member 1. Each leg link 3 is movably engaged with the guide rail 31a via a plurality of rollers 32b pivotally attached to a slider 32a which is fixed to the upper end of the first link member 32. In this way, each leg link 3 swings in the anteroposterior direction around the center of curvature of the guide rail 31a. Therefore, the anteroposterior swing fulcrum of each leg link 3 functions as the center of curvature of the guide rail 31a.

Furthermore, the guide rail 31a is pivotally supported at the uprising portion disposed at the front end of the support frame 1b of the seat member 1 via a spindle 31b which is longitudinal in the anteroposterior direction. Therefore, the guide rail 31a is connected to the seat member 1 so as to be able to swing freely in the lateral direction. Accordingly, each leg link 3 is allowed to swing in the lateral direction, which enables the user P to abduct the legs thereof. The center of curvature of the guide rail 31a and the axis line of the spindle 31b are both located above the seat portion 1a. Thereby, the seat member 1 can be prevented from inclining greatly in the vertical direction and in the lateral direction when the user P shifts the body weight thereof.

The driving unit 4 is configured from an electric motor 41, a reduction gear 42 connected thereto, and a transmission link 43 which connects a crank arm 42a as an output member of the reduction gear 42 and an upper end of the second link member 34 extending upward from a joint axis 33a of the second joint portion 33. The power output from the electric motor 41 via the reduction gear 42 is transmitted to the second link member 34 via the transmission link 43, so that the second link member 34 swings around the joint axis 33a with respect to the first link member 32 to bend or stretch the leg link 3.

Each foot attachment portion 2 is equipped with a shoe 21 and a connection member 22 which is set inside the shoe 21. The connection member 22 is connected to the lower end of each leg link 3 via the third joint portion 35, at a position forward of an ankle of the user P. The third joint portion 35 is of a 3-axis structure having a first axis 35a in a horizontal direction which is equal to a lateral direction, a second axis 35b in a vertical direction, and a third axis 35c in an anteroposterior direction, when seen from the front.

Figure 3:
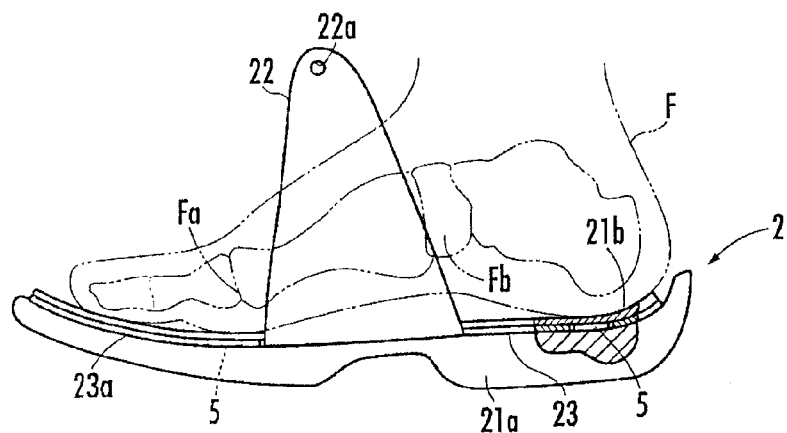
FIG. 3 is a side view of a foot attachment portion of the first embodiment.

As illustrated in FIG. 3, pressure sensors 5, which are for detecting the treading force of the user P, are provided to a sole 21a as a landing member of each foot attachment portion 2. An insole 21b is mounted inside the shoe 21 so as to cover the pressure sensors 5 from above. A 2-axis force sensor 6 is built into the third joint portion 35. The detection signals from the pressure sensors 5 and the force sensor 6 are input to the controller 7 stored in the supporting frame 1b of the seating member 1. The controller 7 drives the second joint portion 33 of the leg link 3 by controlling the electric motor 41, on the basis of the signals from the pressure sensors 5 and the force sensor 6, and executes the walking assist control which generates the body weight relieving assist force mentioned above.

In a sagittal plane (a vertical projection plane along the anteroposterior direction), the body weight relieving assist force is acted on a connection line (hereinafter, referred to as a reference line) joining a swing fulcrum of the leg link 3 with respect to the first joint portion 31 in the anteroposterior direction and the first axis 35a which is a swing fulcrum of the leg link 3 with respect to the third joint portion 35 in the anteroposterior direction. In the walking assist control, the actual body weight relieving assist force acted on the reference line (accurately, a resultant force between the body weight relieving assist force and a force generated by the self weight of the seat member 1 and each leg link 3) is calculated based on the detected value of a force in a biaxial direction detected by the force sensor 6. On the basis of the detected force by the pressure sensors 5 in each foot attachment portion 2, a ratio of the treading force of each foot F with respect to the total treading force of both feet F of the user P is calculated. Then, a desired control value of the body weight relieving assist force which should be generated for each leg link 3 is calculated by multiplying a predefined value of the body weight relieving assist force by the ratio of the treading force of each foot F. Subsequently, the electric motor 41 is controlled so that the actual body weight relieving assist force calculated on the basis of the detected value of the force sensor 6 becomes the desired control value.

Here, the connecting member 22 of the foot attachment portion 2 is connected so as to have a degree of rotational freedom with respect to the leg link 3 around an axis line in the horizontal direction seen from front, that is, around the first axis 35a of the third joint portion 35. Therefore, the direction of action of the load (body weight relieving assist force) transmitted from the leg link 3 to the connecting member 22 inclines back and forth during walking, so that a rotational moment in the anteroposterior direction acts on the connecting member 22. When the connecting member 22 wobbles back and forth from the rotational moment, the portion of the shoe 21 coming into contact with the connecting member 22 wears out by being rubbed therewith, so that the durability of the shoe 21 is degraded.

Figure 4:
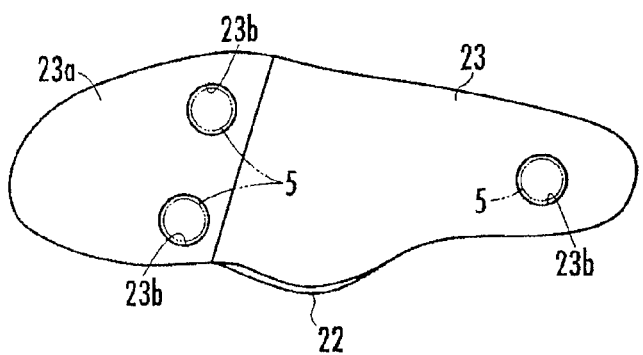
FIG. 4 is a plan view of a connecting member and a footplate member equipped to the foot attachment portion in FIG. 3.

Therefore, in the present embodiment, as is shown in FIG. 3 and FIG. 4, a footplate member 23 comprised of a rigid plate capable of being stepped on by the foot F of the user P at outside the acting range in the sagittal plane of the load transmitted from the leg link 3 to the connecting member 22 is provided, and the footplate member 23 is placed on the sole 21a as the landing member at the underside of the insole 21b. The connecting member 22 is coupled to the footplate member 23, so as to limit the rotation with respect to the footplate member 23 around the axis line in the horizontal direction seen from front. In FIG. 3, the portions other than the sole 21a and insole 21b of the shoe 21 are omitted. In FIG. 3, reference number 22a denotes a fitting hole for the first axis 35a of the third joint portion 35.

Here, the acting range in the sagittal plane of the load transmitted from the leg link 3 to the connecting member 22 during normal walking falls within an angle of 23.5° in both directions from the vertical line passing through the first axis 35a. The heel of the foot F is positioned rearward of this acting range. Therefore, in the present embodiment, the footplate member 23 is made to be stepped on by the heel. The footplate member 23 and the connecting member 22 are formed integrally.

According to the configuration mentioned above, even when the rotational moment in the anteroposterior direction acts on the connecting member 22, the footplate member 23 is stepped on by the foot F (heel) of the user P at outs de the acting range of the load, so that the connecting member 22 coupled to the footplate member 23 does not wobble back and forth. Therefore, wearing out of the shoe 21 caused by the wobbling of the connecting member 22 does not occur, and the durability of the foot attachment portion 2 is improved.

Even though the connecting member 22 is not fixed to the shoe 21 by adhesion or the like, the stability of the connecting member 22 is secured by the stepping on of the footplate member 23 as mentioned above. As such, the footplate member 23 coupled to the connecting member 22 need only to be inserted into the shoe 21. Therefore, it is not necessary to manufacture special shoes with the connecting member 22 fixed thereto, so that convenience is enhanced.

In the present embodiment, the connecting member 22 is coupled to the footplate member 23 in a cantilevered state, so as to pass through a lateral inside of the portion between the toe joint (MP joint) Fa and a navicular bone Fb of the foot F of the user P. By doing so, unlike the conventional stirrup-type connecting member, the foot F is not constrained by the connecting member 22, so that the wearability is improved. In the present embodiment, the connecting member 22 is formed in a curved surface shape, so as to enable improvement of rigidity of the connecting member 22.

Here, the footplate member 23 has a portion extending to the front from the portion where the heel of the foot F steps thereon, and this frontward portion ends before the MP joint Fa of the foot F. If this is left as it is, there is a possibility that the footplate member 23 is displaced forward inside the shoe 21. Therefore, an extended plate 23a having flexibility is connected to the footplate member 23 so as to reach the leading end of the shoe 21, in order to prevent displacement of the footplate member 23.

Here, it may be conceivable to configure the footplate member 23 from one rigid plate extending from the heel to the toe of the foot F. However, such configuration inhibits the degree of freedom of the movement of the toes of the user P, especially the dorsiflexion of the toes. In contrast thereto, when the extended plate 23a of the footplate member 23 is made from material having flexibility as in the present embodiment, the degree of freedom of the movement of the toes is secured, so that it is advantageous. As long as a portion of the extended plate 23a positioned in a range of approximately 15 mm forward and backward from immediately below the MP joint Fa has flexibility, then it is possible to secure the degree of freedom of the movement of the toes. Therefore, the portion of the extended plate 23a positioned forward of this portion may be formed from a rigid plate.

The pressure sensors 5 are arranged at three places in total, namely, one at the heel side, and two at the toe side that are spaced apart laterally. To the footplate member 23, relief holes 23b with respect to the pressure sensors 3 are provided. By doing so, the load transmitted from the leg link 3 to the footplate member 23 via the connecting member 22 does not act on the pressure sensors 5. Therefore, it becomes possible to accurately detect the treading force of the user P with the pressure sensors 5.

Figure 5:
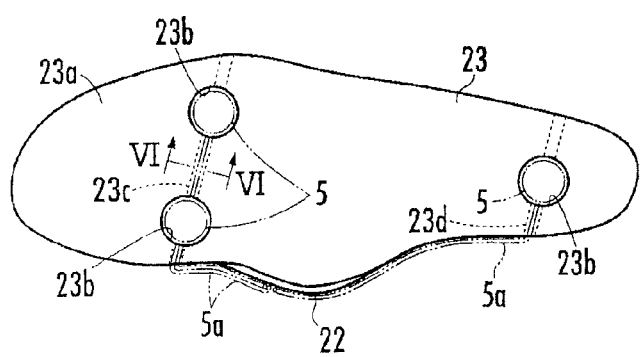
FIG. 5 is a plan view of a connecting member and a footplate member according to a second embodiment.
Figure 6:
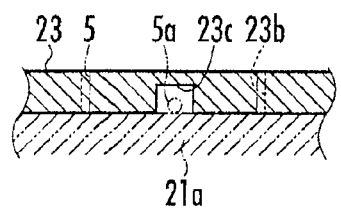
FIG. 6 is an enlarged cross-sectional view taken along line VI-VI in FIG. 5.

Next, with reference to FIG. 5 and FIG. 6, a second embodiment in which the structure of the footplate member 23 is changed will be explained. The footplate member 23 is configured from one rigid plate extending from the heel to the toe of the foot of the user. To the undersurface of the portion of the footplate member 23 positioned below the MP joint, a first groove 23c is formed so as to cut across the footplate member 23. Because the position of the MP joint of each toe is displaced in the anteroposterior direction, the first groove 23c is formed so as to cut across the footplate member 23 diagonally. By doing so, the footplate member 23 is capable of bending at the first groove 23c. As such, even though the footplate member 23 is configured from one rigid plate extending from the heel to the toe, the dorsiflexion of the toe is allowed, so that walking is made possible without any trouble.

As is with the first embodiment, the footplate member 23 is formed with relief holes 23b with respect to the pressure sensors 5 arranged at two places in the toe side and one place in the heel side of the sole 21a as the landing member. The first groove 23c is formed so as to intersect with the relief holes 23b with respect to the pressure sensors 5 at the toe side. To the undersurface of the portion of the footplate member 23 positioned below the heel, a second groove 23d is formed so as to cut across the footplate member 23 and so as to intersect with the relief hole 23b with respect to the pressure sensor 5 of the heel side.

A wiring 5a for each pressure sensor 5 is passed through each groove 23c and 23d and is led to the connecting member 22. From the connecting member 22, the wiring 5a is provided along the leg link 3, and is connected to the controller 7 inside the support frame 1b of the seat member 1. By doing so, the wiring 5a does not touch the foot of the user, so that the foot comfort is improved, and at the same time, the grooves 23c, 23d function as a protection groove which prevents the treading force from acting on the wiring 5a, so that disconnection of the wiring 5a is prevented.

Figure 7:
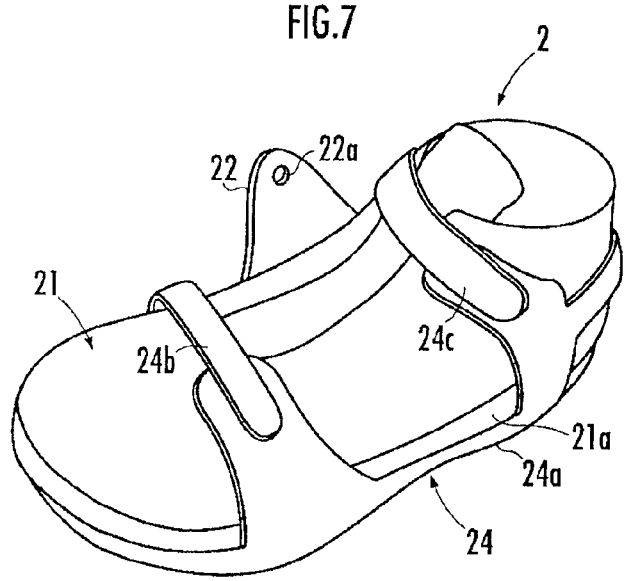
FIG. 7 is a perspective view of a foot attachment portion according to a third embodiment.
Figure 8:
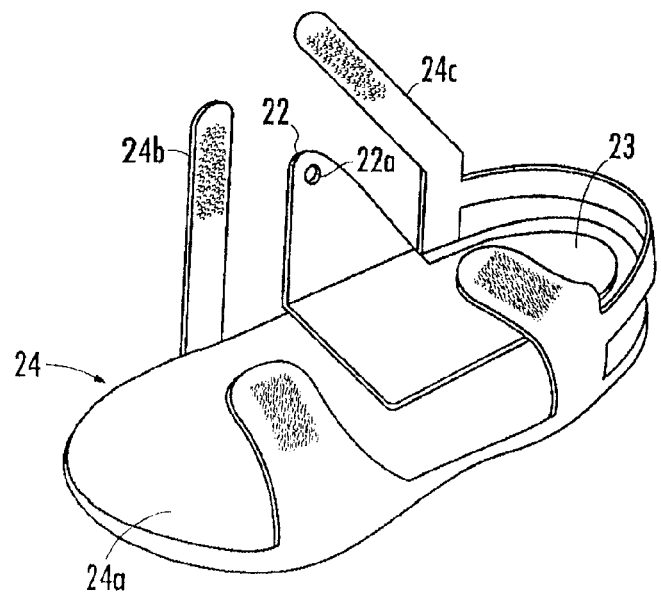
FIG. 8 is a perspective view of an adaptor of the foot attachment portion in FIG. 7.

Next, with reference to FIG. 7 and FIG. 8, a third embodiment in which the structure of the foot attachment portion 2 is changed will be explained. The foot attachment portion 2 is configured from the shoe 21, and an adapter 24 which is externally fitted releasably to the shoe 21. The adapter 24 is of a sandal-like shape with a sole portion 24a which is for mounting the sole 21a of the shoe 21, and is equipped with a lengthwise pair of bands 24h, 24c with a hook-and-loop fastener for externally fixing the adapter 24 to the shoe 21. The adapter 24 may be tightened to the shoe 21 using a string or the like.

The adapter 24 is provided with the connecting member 22 formed with an attachment hole 22a for the first axis 35a of the third joint portion 35 of the first embodiment and the footplate member 23 comprised of a rigid plate. The footplate member 23 is fixed to a rear upper surface of the sole portion 24a of the adapter 24 by a rivet or the like, so as to be stepped on by the heel, which is a portion of the foot of the user positioned outside of the acting range in the sagittal plane of the load transmitted from the leg link to the connecting member 22, via the sole 21a. The connecting member 22 is integrally coupled to the footplate member 23 in a cantilevered state, so as to pass through a lateral inside of the portion between the toe joint and the navicular bone of the foot of the user when the adapter 24 is externally fitted to the shoe 21.

According to the walking assist device of the third embodiment, the stability of the connecting member 22 is secured by the stepping on of the footplate member 23, so that the connecting member 22 does not wobble back and forth. Therefore, the wear out of the foot attachment portion 2 caused by the wobbling of the connecting member 22 is prevented from occurring, so that the durability is improved. In the third embodiment, there is no need to mount the connecting member 22 and the footplate member 23 to the shoe 21, and the user may use the user's comfortable shoe 21 without modification, so that the convenience is improved further.

The embodiments of the present invention are explained above with reference to the drawings. However, the present invention is not limited thereto. For example, in the above-mentioned embodiments, the leg link 3 is configured from a link capable of bending and stretching freely, and having the rotary-type second joint portion 33 at the intermediary thereof. However, the leg link 3 may be configured from a link capable of bending and stretching freely, having a direct acting type second joint portion. Further, the load transmit portion may be configured from a harness to be attached around the user's waist. Still further, in order to assist walking of the user having one leg injured such as a broken leg, it is possible to omit one leg link while leaving the leg link on the injured leg side from the right and left leg links 3, 3, of the above-mentioned embodiments.

The invention claimed is:

1. A walking assist device, comprising:
a load transmit portion, a foot attachment portion adapted to be fitted to a foot of a user, and a leg link provided between the load transmit portion and the foot attachment portion, so as to support at least a part of a weight of the user by the leg link via the load transmit portion when the walking assist device is worn by the user, in which the foot attachment portion is formed integrally with a connecting member connected to a lower end of the leg link at a position forward of an ankle of the user while having at least a degree of rotational freedom around an axis line in a horizontal direction as seen from a front of the walking assistance device when the walking assist device is worn by the user;
wherein the foot attachment portion is equipped with a footplate member comprised of a rigid plate and is adapted such that the rigid plate is stepped on by the foot of the user at a position outside of a region below an acting range in a sagittal plane of a load transmitted from the leg link to the connecting member when the foot of the user is fitted to the foot attachment portion, and the connecting member is formed integrally with the footplate member so as to limit the rotation with respect to the footplate member around the axis line in the horizontal direction.

2. The walking assist device according to claim 1, wherein the foot attachment portion is configured from a shoe and an adapter to be externally fitted releasably to the shoe, and the adapter is provided with the footplate member and the connecting member.

3. The walking assist device according to claim 2, wherein the connecting member is coupled to the footplate member in a cantilevered state at a position disposed laterally inward of a leg of the user when the foot of the user is fitted to the foot attachment portion, so as to pass through a lateral inside of the portion between a toe joint and a navicular bone of the foot of the user.

4. The walking assist device according to claim 1, wherein the connecting member is coupled to the footplate member in a cantilevered state at a position disposed laterally inward of a leg of the user when the foot of the user is fitted to the foot attachment portion, so as to pass through a lateral inside of the portion between a toe joint and a navicular bone of the foot of the user.

5. The walking assist device according to claim 1, wherein the foot attachment portion is equipped with a shoe in which the footplate member is received, a groove that cuts substantially laterally across an entirety of the footplate member is defined in the footplate member, and the foot attachment portion is adapted such that the groove is disposed below a metacarpophalangeal joint of the user when the foot attachment portion is fitted to the foot of the user.

6. The walking assist device according to claim 5, wherein the shoe of the foot attachment portion includes a landing member arranged beneath the footplate member, the landing member is provided with a pressure sensor capable of detecting a treading force of the user, and a wiring for the pressure sensor is passed through the groove.

7. The walking assist device according to claim 5, wherein the footplate member is formed of one rigid plate, and the groove is formed such that the footplate member is bendable about the groove.

8. The walking assist device according to claim 7, wherein the groove is an only groove defined in the footplate member.

9. The walking assist device according to claim 5, wherein the footplate member is removably received in the shoe.

10. The walking assist device according to claim 1, wherein the foot attachment portion is adapted such that a heel of the user steps on the footplate member when the foot attachment portion is fitted to the foot of the user.

11. A walking assist device, comprising:
a load transmit portion, a foot attachment portion adapted to be fitted to a foot of a user, and a leg link provided between the load transmit portion and the foot attachment portion, so as to support at least a part of a weight of the user by the leg link via the load transmit portion when the walking assist device is worn by the user, in which the foot attachment portion is equipped with a connecting member connected to a lower end of the leg link at a position forward of an ankle of the user while having at least a degree of rotational freedom around an axis line in a horizontal direction as seen from a front of the walking assistance device when the walking assist device is worn by the user;
wherein the foot attachment portion is equipped with a footplate member formed of a rear portion joined to a front portion, the rear portion comprised of a rigid plate capable of being stepped on by the foot of the user at a position outside of an acting range in a sagittal plane of a load transmitted from the leg link to the connecting member, the front portion is more flexible than the rear portion, and the connecting member is formed integrally with the footplate member so as to limit the rotation with respect to the footplate member around the axis line in the horizontal direction seen from front of the walking assist device.

12. The walking assist device according to claim 11, wherein the foot attachment portion is adapted such that a heel of the user steps on the rear portion of the footplate and a metacarpophalangeal joint of the user steps on the front portion of the footplate when the foot attachment portion is fitted to the foot of the user.

13. The walking assist device according to claim 12, wherein the connecting member is formed integrally with the rear portion of the footplate member.

* * * * *